Feb. 9, 1926. 1,572,600
H. T. GRAFTON ET AL
PROCESS OF ANNEALING IRON ARTICLES
Filed March 30, 1921    2 Sheets-Sheet 2
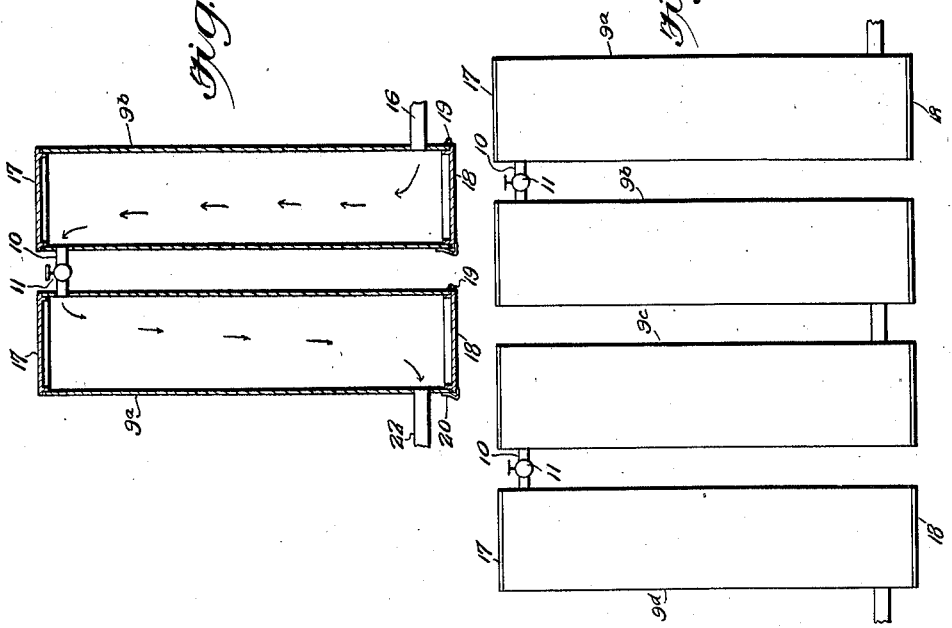
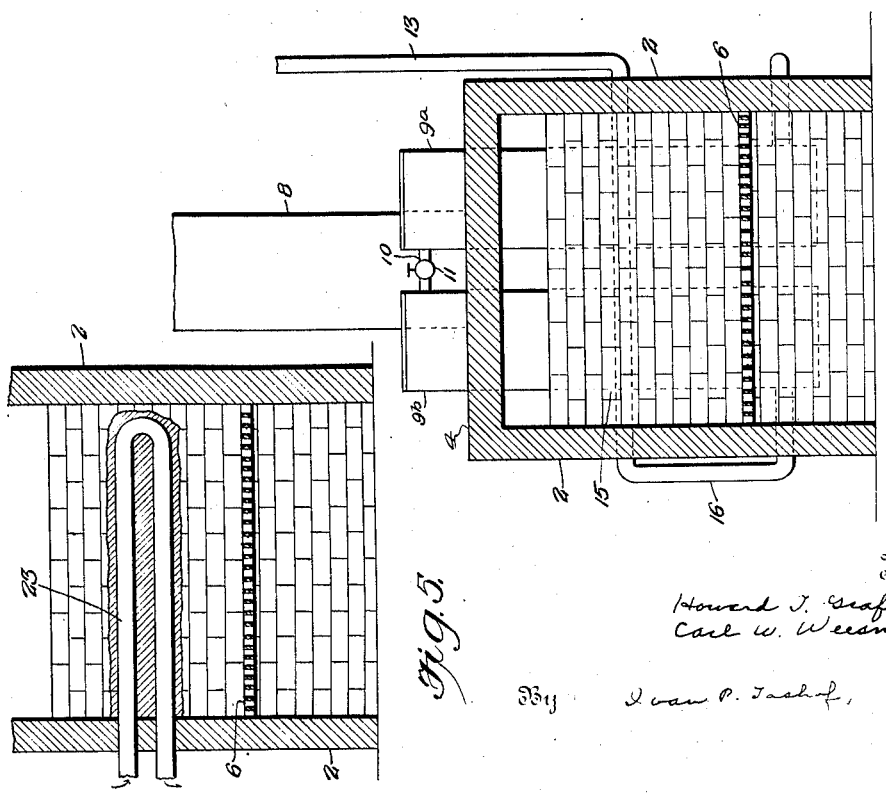
Inventors
Howard T. Grafton
Carl W. Weesner
By Ivan P. Tashof,
Attorney Patented Feb. 9, 1926.

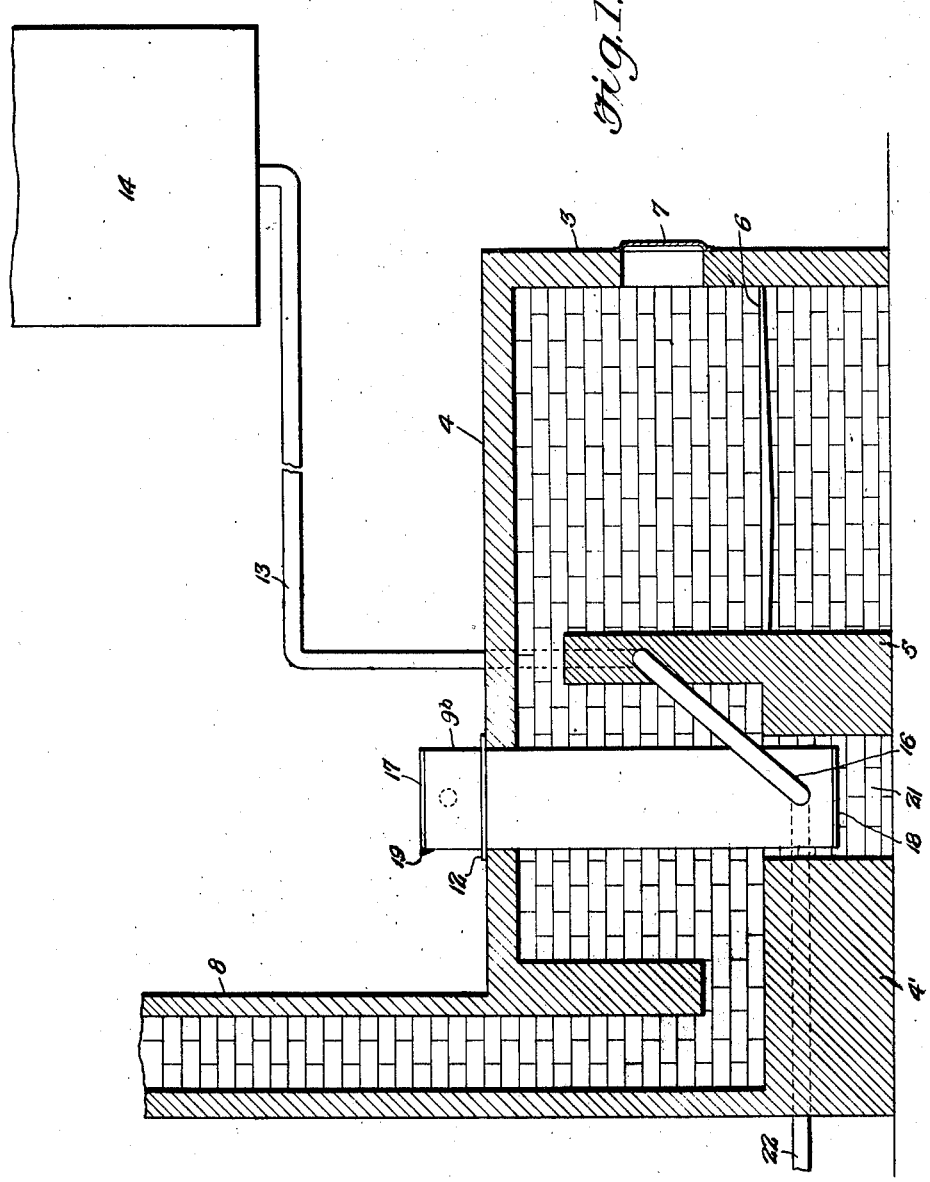

1,572,600

UNITED STATES PATENT OFFICE.

HOWARD TOLAN GRAFTON AND CARL WILLIAM WEESNER, OF WARREN, OHIO.

PROCESS OF ANNEALING IRON ARTICLES.

Application filed March 30, 1921. Serial No. 456,914.

*To all whom it may concern:*

Be it known that HOWARD T. GRAFTON and CARL W. WEESNER, citizens of the United States, both residing at Warren, in the county of Trumbull and State of Ohio, have invented certain new and useful Improvements in Processes of Annealing Iron Articles, of which the following is a specification.

Our invention relates to a process for purifying gas, more particularly, producer-gas so as to make the latter adaptable for the annealing of iron articles without staining the same.

Raw producer-gas coming from a producer, preferably utilizing charcoal-fuel, has the following composition:

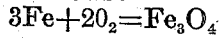

Gas of such a composition is not suitable for bright annealing since, due to its high moisture, carbon dioxid and oxygen contents, it is not completely reducing in its effect. It follows therefrom that gas of such a composition when applied to the annealing of steel plates, will not produce a bright finish which is essential to the product. Unless the steel plates are free from stains, they must be discarded.

The oxygen in the gas reacts with the steel plates as follows:

$$3Fe + 2O_2 = Fe_3O_4$$

The moisture reacts as follows:

$$3Fe + 4H_2O = Fe_3O_4 + 4H_2$$

Both of these reactions produce badly blued edges.

The carbon dioxid present in the gas serves to dilute the same and renders it less reducing in its action. If the carbon dioxid in converted into carbon monoxid the gas will have considerably increased reducing-value.

The object of our invention is to purify producer-gas by decreasing its moisture and carbon dioxid-contents and substantially eliminating the oxygen-content, thereby forming a gas more completely reducing in its effect, and rendering possible its application in an economic and efficient manner to annealing and similar processes.

For a complete understanding of our invention, reference is directed to the accompanying drawings in which:—

Figure 1 is a side view partly in section of the purifying-apparatus;

Figure 2 is an end view of the same partly in section;

Figure 3 is a side view of the purification chambers;

Figure 4 is a vertical sectional view of the same, and

Figure 5 is a detail partly in section of a modified preheating chamber.

Referring to the drawings, the apparatus comprises a furnace designated as a whole by the numeral 1 having the customary side and end walls 2 and 3, roof 4, and bottom 4', fire wall 5, and grate 6. The furnace is provided with a fire door 7 and flue 8. Suspended from the roof 4 by the flanges 12 and protruding therefrom are longitudinally extended purification chambers $9^a$ and $9^b$ suitably connected with each other by means of conduits 10 carrying valves 11. The purification-chambers may form a single battery as shown in Figures 2 and 4 or a series as shown in Figure 3. The feed pipe 13 carries the gas to be purified from a suitably located storage-tank 14 to the preheater 15 which is enclosed in a refractory material, preferably the fire wall 5, adapted to be heated by the furnace-gases. The preheater 15 is integral with the pipe 16 which is substantially outside of the furnace wall 2 and leads to the purification-chamber $9^b$. The purification-chambers $9^a$ and $9^b$ have removable top and bottom plates 17 and 18, both preferably hinged as at 19. The bottom plates are provided with plate-retaining-means 20.

The furnace is provided with a tunnel or pit 21 and the purification chambers only partially extend into the same, thereby permitting access at all times to the chambers. The purified gas passes from the furnace by means of the conduit 22. The preheater may be in the form of a U-tube 23 as shown in Figure 5.

The preheater and purification-chambers may be made of any suitable material but are preferably formed of wrought iron-material and carry on the outside thereof a fireproof cement coating.

The construction set forth provides a simple yet efficient apparatus. The purification-chambers which are always completely occupied with a porous purification-medium free from channels, preferably charcoal, are as above described, longitudinally extended, and protrude from the roof of the furnace, thereby making the chambers accessible from the outside of the furnace, facilitating cleaning and refilling without disturbing the fire. This arrangement makes it possible to have most of the chamber-connections outside of the furnace. As the chambers $9^a$ and $9^b$ are suspended from the roof by means of flanges 12, they may be easily removed in case it becomes necessary to replace them.

Since the reactions that occur in the purification-chambers only take place at or above 500° C. and as all the reactions with the exception of one are endothermic, it is essential to deliver the gas to the purification-chambers as hot as possible and this is advantageously accomplished by passing the gases through the preheater 15.

In the operation of the apparatus set forth the producer-gas containing considerable quantities of moisture, carbon dioxid and oxygen is passed from the storage-tank 14, through conduit 13 to the preheater 15 located in the fire wall 5 and then through conduit 16 into the longitudinally extended purification chambers $9^a$ and $9^b$, which are substantially completely filled with a porous purification-medium, preferably charcoal. Any substance which is porous and free from sulfur and acts as reducing medium may be used. Carbonaceous material, and more particularly, charcoal is preferred. Longitudinally-extended chambers provide a large purification-surface and this is highly desirable. The gas free from contaminating addition fluids such as steam enters chamber $9^b$ through conduit 16 and passes upwardly through the chamber filled with the purification-medium and into chamber $9^a$ by means of conduit 10. The gas passes downwardly through chamber $9^a$ and into conduit 22. The direction which the gas takes in its passage through the chambers is indicated by the arrows in Figure 4.

The purification is effected at a temperature of 500° C. or above and we have ascertained that for the removal of the impurities this is the minimum temperature that may be employed. The temperature may be increased above this to any degree the furnace will stand, and the higher the temperature, the greater the efficiency.

While we do not desire to limit our invention to any particular theory as to the action of the charcoal upon the gas, it is thought that the charcoal acts upon the undesirable constituents of the producer-gas as hereinafter described.

The carbon dioxid is reduced according to the equation:

$$CO_2 + C \rightleftharpoons 2CO.$$

As this is a reversible reaction, and the reverse occurs at temperatures lower than 500° C., it is essential to keep the purification-chambers at a higher temperature.

The moisture reacts with the carbon in two different ways as follows:

1. $C+2H_2O=CO_2+2H_2$.
2. $C+H_2O=CO+H_2$.

At 500 to 600° C. reaction 1 predominates; as the temperature rises reaction 2 gradually asserts itself until, at a temperature of 1000° C. and above it occurs exclusively. Both of these reactions are exceedingly endothermic in character.

The oxygen is removed by combination with the carbon, forming first carbon dioxid which is subsequently changed to carbon monoxid as heretofore indicated.

It follows from the above that it is necessary to keep the temperature of the purification-medium as high as possible in order to convert the carbon dioxid, moisture and oxygen-contents of the producer-gas from harmful to useful gases. The preheating of the producer-gas is a considerable aid in maintaining the correct temperature-conditions.

If the producer-gas contains sulfur, this may be efficiently removed by passing the gas through ferric hydrate, previous to its entry to the purification-chambers or the same may be accomplished by filling the preheater 15 with steel wool or lime. The absorption of the sulfur by the lime probably occurs at 600° C. or above.

The removal of sulfur and any other undesirable constituents besides those indicated may be effected by adding additional purification-chambers and filling them with the appropriate purification-medium.

Producer gas made according to our process is substantially free from oxygen and contains a quantity of moisture insufficient to stain iron plates when used to anneal the same. The finished gas may contain carbon dioxid not exceeding four per cent, and moisture not exceeding 2 grains per cubic foot. These figures are, of course, approximate and may vary considerably according to the composition of the raw gas and the specific conditions of treatment.

The term, "iron articles" as used in the claims is intended to cover the different varieties of iron capable of being annealed and particularly, articles made of steel.

We claim:

1. In a process of annealing iron articles, the use of purified producer gas substantially free from oxygen and containing a quantity of moisture insufficient to stain the iron article.

2. In the process of annealing iron articles, the use of purified producer gas containing carbon dioxid not exceeding 4%, moisture not exceeding two grains per cubic feet, and substantially free from oxygen.

3. In the process of annealing iron articles, the use of purified producer gas containing a quantity of moisture insufficient to stain the iron article.

In testimony whereof we hereunto affix our signatures.

HOWARD TOLAN GRAFTON.
CARL WILLIAM WEESNER.